United States Patent [19]
Jain

[11] Patent Number: 5,876,662
[45] Date of Patent: Mar. 2, 1999

[54] ODOR CONTROL SYSTEM

[75] Inventor: Roop C. Jain, San Diego, Calif.

[73] Assignee: US Filter/RJ Environmental, Inc., San Diego, Calif.

[21] Appl. No.: 794,558

[22] Filed: Feb. 3, 1997

Related U.S. Application Data

[63] Continuation-in-part of Ser. No. 427,128, Apr. 24, 1995, abandoned, which is a continuation-in-part of Ser. No. 232,203, filed as PCT/US92/09248, Oct. 27, 1992, Pat. No. 5,518,696, which is a continuation-in-part of Ser. No. 783,178, Oct. 28, 1991, abandoned.

[51] Int. Cl.$^6$ ............ C23F 11/04; C23F 11/06; A62B 7/08; B01D 50/00
[52] U.S. Cl. ............ 422/12; 422/13; 422/122; 422/123; 422/171; 422/173; 423/243
[58] Field of Search ............ 422/12, 13, 122, 422/123, 171, 173; 95/187, 211, 235; 55/233, 249; 261/94, DIG. 72; 423/243

[56] References Cited

U.S. PATENT DOCUMENTS

| | | | |
|---|---|---|---|
| 2,878,107 | 3/1959 | Ruth | 55/233 |
| 3,596,439 | 8/1971 | Moragne | 55/233 |
| 3,739,551 | 6/1973 | Eckert | 55/90 |
| 3,785,127 | 1/1974 | Mare | 55/233 |
| 3,818,683 | 6/1974 | Hirsch | 55/223 |
| 3,969,479 | 7/1976 | Lonnes et al. | 423/210 |
| 3,969,482 | 7/1976 | Teller | 423/235 |
| 3,989,464 | 11/1976 | Dahlstrom | 23/260 |
| 4,022,593 | 5/1977 | Lerner | 55/90 |
| 4,225,566 | 9/1980 | de Vries | 423/210 |
| 4,269,812 | 5/1981 | Edwards et al. | 423/242 |
| 4,307,067 | 12/1981 | Tagawa et al. | 423/224 |
| 4,312,643 | 1/1982 | Cheng | 55/73 |
| 4,419,331 | 12/1983 | Montalvo | 422/170 |
| 4,421,534 | 12/1983 | Walker | 55/73 |
| 4,437,867 | 3/1984 | Lerner | 55/233 |
| 4,609,386 | 9/1986 | Sibley et al. | 55/223 |
| 4,627,965 | 12/1986 | Hegemann et al. | 423/242 |
| 4,735,787 | 4/1988 | Mouche et al. | 423/242 |
| 4,948,402 | 8/1990 | Davis | 55/233 |
| 5,160,707 | 11/1992 | Murray et al. | 422/170 |
| 5,262,135 | 11/1993 | Lell et al. | 423/220 |
| 5,330,725 | 7/1994 | Mumalo | 422/170 |
| 5,543,122 | 8/1996 | Hammond et al. | 423/220 |

Primary Examiner—Nina Bhat
Attorney, Agent, or Firm—William Patrick Waters

[57] ABSTRACT

An odor control system for removing hydrogen sulfide from a gas stream. In a first chamber, the gas stream is initially treated with NaOH at low pH for removal of about 70% of the $H_2S$. Unreacted NaOH and the reaction product $Na_2S$ flow into a first sump while the initially treated gas stream flows into a second chamber, fluidly connected to a second sump. In the second chamber, the gas stream is scrubbed with a solution of NaOH and NaOCl for scrubbing of the remaining $H_2S$ before the cleaned gas is exhausted to atmosphere. From the second chamber, unreacted NaOH and NaOCl, together with reaction products sulfur, $Na_2SO_4$ and $Na_2S$ flow into the second sump. The contents of the two sumps are flushed out separately by adding make up water to each of them. Each sump has a separate drain and each drain empties into a common drain where the $Na_2S$ from the first sump reacts with unreacted NaOCl from the second sump to produce sulfur and $Na_2SO_4$. These products are then washed from the common drain into a sewer.

9 Claims, 1 Drawing Sheet

ODOR CONTROL SYSTEM

RELATED APPLICATIONS

This is a continuation-in-part patent application of U.S. patent application Ser. No. 08/427,128, filed Apr. 24, 1995, now abandoned which is a continuation-in-part patent application of U.S. patent application Ser. No. 08/232,203, filed Apr. 28, 1994, now U.S. Pat. No. 5,518,696, which is a 35 U.S.C. Section 371 of PCT/US92/09248, filed Oct. 27, 1992, as a continuation-in-part patent application of U.S. patent application Ser. No. 07/783,178, filed Oct. 28, 1991, now abandoned. U.S. Pat. No. 5,518,696 is incorporated herein by reference.

TECHNICAL FIELD

The present invention relates in general to control systems and methods of using them for removing unwanted constituents from fluid streams. More particularly, the present invention relates to an odor control system which operates in a more effective and efficient manner while reducing operating costs over the lifetime of the system.

BACKGROUND ART

The increasing concentration of population in urban settings presents important environmental problems. Prominent among them is presented when it becomes desirable, from a public health or aesthetic consideration, to remove unwanted odorous constituents from a gas stream, prior to its release into the atmosphere.

Various techniques have been developed in response to the need for odorous constituent removal. As a general rule, an effective technique should be tailored to the particular constituent to be removed. In the waste water system environment, a primary cause of odor is hydrogen sulfide which is detectable by the human olfactory sense at very low concentrations. In addition to the unpleasant odor associated with it, hydrogen sulfide is noted for its toxicity and its capacity for corroding materials with which it comes in contact.

Because of the undesirability of introducing hydrogen sulfide into the atmosphere, it is desirable to have systems for removing, in a cost effective manner, substantial amounts of the unwanted substance, preferably at or near the source of its production.

As more particularly discussed in copending U.S. patent application Ser. No. 08/427,128, removal of odorous constituents from a waste gas stream can be accomplished by several techniques. In many cases, an odor control technique of choice is absorption, or chemical oxidation, a process in which odorous constituents in a gas stream are transferred into a liquid solution and are chemically oxidized in the liquid phase. Acceptance of this process is due, at least in part, to cost considerations, especially when large gas volumes, having relatively low concentrations of odorous constituents, are involved. In general, the technique is utilized in a packed tower conventionally known as a scrubber.

In scrubber systems utilizing the absorption method, reaction between chemical treating agents and the odorous constituents takes place in the liquid phase. Removal efficiency depends on the transfer rate of the compounds from air into liquid, and reaction kinetics. This, in turn, is dependent on the mass transfer coefficient and total interfacial surface area. Such considerations drive scrubber packed tower design.

A significant problem in conventional packed towers is plugging of the packing as a result of accumulation of solids. Such accumulations can quickly lead to reduced system efficiency. Plugging may be caused by a variety of operational parameters such as hardness of make-up water, the chemical reagents utilized, and system pH. It is generally recognized that plugging can be effectively reduced or eliminated by purging the system. In the purging process, an amount of the recirculation stream, together with an equal or greater amount of the by-product salts created and added to the system, must be constantly removed from the sump to prevent the accumulation of solids and resultant plugging. Fresh make-up water and new chemical reagent must be added to replace the purge stream.

However, a major concern in consideration of system purge rate is the cost of unreacted chemical reagent which is sent to the drain during the purging process. Over time, this cost can make system operation prohibitively expensive. The alternative, an inefficient, plugged system, is also unacceptable.

In other cases, hardness in the water supply and the carbonates which are often present cause precipitates to form on packing medium surfaces, especially when the system is operated at an elevated pH. In some cases, it becomes necessary to shut down the odor control system in order to acid wash or otherwise clean control system surfaces.

In view of the foregoing, it would be highly desirable to have an odor control system which could function efficiently while reducing scaling problems. Of course, it would be beneficial if such a system would conserve reagents, thereby reducing operating costs.

A review of prior art systems reveals that one conventional technique for scrubbing hydrogen sulfide includes using only sodium hydroxide while, in another technique, sodium hydroxide and sodium hypochlorite are utilized to oxidize the hydrogen sulfide. The advantages and disadvantages of each technique deserve some mention.

In the first case, in which NaOH only is used, typically in a single stage system, a reaction occurs as follows:

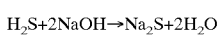

An advantage of this conventional technique is that it is relatively inexpensive to operate since the cost to remove $H_2S$ with sodium hydroxide is about eight to ten times less expensive than with sodium hypochlorite. As an example, for a gas stream flowing at 10,000 cfm, bearing 100 ppm $H_2S$, to have about 127 lbs./day of $H_2S$ removed, the annual cost with NaOH as the reagent of choice is about $20,000 per year, compared with about $293,000 with other conventional systems, as pointed out below.

However, the cost advantage of the sodium hydroxide process is offset by several limitations. One limitation of the sodium hydroxide technique is that scaling is a problem. Another is that a long residence time is required for thorough gas treatment. This means that facility costs are increased because a large treatment tower is required. Another significant limitation is evident in some cases when system blow down is discharged into a sewer having an acidic pH. In these cases, the above reaction is reversible and, when the pH drops below about 7, $H_2S$ is regenerated.

In addition to the foregoing limitations in the conventional sodium hydroxide system, such systems operate at high pH (typically 11–12). Hydrogen sulfide containing gases typically contain carbon dioxide which, at elevated pH, reacts with sodium hydroxide as follows:

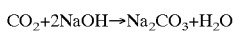

Thus, it will be appreciated that the presence of the carbon dioxide, coupled with the requirement of operating at an elevated pH, results in the need for additional sodium hydroxide than would be predicted for hydrogen sulfide removal alone. This factor, of course, means increased reagent usage resulting in elevated operating costs over the life of the system.

In the second conventional technique for removing hydrogen sulfide from a gas stream, sodium hydroxide is utilized in combination with sodium hypochlorite. System reactions, assuming complete oxidation, are as follows:

$$H_2S+2NaOH+4NaOCl \rightarrow Na_2SO_4+4NaCl+2H_2O$$

$$NaOCl+H_2S \rightarrow NaCl+H_2O+S$$

Advantages of this process, in contrast to the use of sodium hydroxide alone, are that the system pH is generally lower (typically 9–10) and $CO_2$ absorption is reduced. In addition, less scaling occurs and there is less $H_2S$ regeneration. Further, a smaller scrubber tower may be utilized, thereby reducing facility operating costs.

A significant disadvantage of the sodium hydroxide/sodium hypochlorite process is reagent cost. For example, in scrubbing the 10,000 cfm gas stream mentioned above, from which 127 lbs./day of $H_2S$ are removed, typical annual operating costs can be as high as $293,000.

By way of summary of advantages and disadvantages of the two conventional processes described herein, reference may be made to Table I.

TABLE I

COMPARISON OF SYSTEMS UTILIZING NaOH
WITH SYSTEMS UTILIZING NaOH and NaOCl

| NaOH | |
|---|---|
| ADVANTAGE | DISADVANTAGES |
| Low Operating Cost | High pH (11–12) |
| | Scaling |
| | $CO_2$ Absorption |
| | $H_2S$ Regeneration |
| | Longer Residence Time |

| NaOH and NaOCl | |
|---|---|
| ADVANTAGES | DISADVANTAGE |
| Lower pH (~10) | High Operating Cost |
| Lower $CO_2$ Absorption | |
| Less Scaling | |
| No $H_2S$ Regeneration | |
| Smaller Tower | |

As Table I shows, there are several advantages to the second process. In view of the comparative results, the second process would be expected to be the system of choice in many cases. However, the high annual operating cost, multiplied by the many years of useful life of a scrubber using the process, often makes the process economically prohibitive.

In view of the foregoing, it would be desirable to have an odor control system which affords the advantages of conventional systems while substantially avoiding their limitations. Ideally, such a system would be capable of efficient performance over many years with substantial reductions in operating costs, as compared to conventional systems.

DISCLOSURE OF THE INVENTION

The principal object of the present invention is to provide a new and improved odor control system, and method of using it, for removing unwanted substances while substantially reducing operating costs.

It is another object of the present invention to provide a new and improved odor control system which, compared to conventional systems, operates with substantially reduced maintenance requirements.

Briefly, the above and further objects of the present invention are realized by providing an odor control system, and method, for removing hydrogen sulfide from a gas stream. In a first chamber, the gas stream is initially treated with NaOH at low pH for removal of about 70% of the $H_2S$. Unreacted NaOH and the reaction product $Na_2S$ flow into a first sump while the initially treated gas stream flows into a second chamber.

The second chamber is fluidly connected to a second sump. In the second chamber, the gas stream is scrubbed with a solution of NaOH and NaOCl for scrubbing of the remaining $H_2S$ before the cleaned gas is exhausted to atmosphere. From the second chamber, unreacted NaOH and NaOCl, together with the reaction products sulfur, $Na_2SO_4$ and $Na_2S$ flow into the second sump.

As the gas stream is being scrubbed, the contents of the first and second sumps are flushed out separately by adding make up water to each of the sumps. Each sump has a separate drain and each drain empties into a common drain where the $Na_2S$ from the first sump reacts with unreacted NaOCl from the second sump to produce sulfur and $Na_2SO_4$. These products are then washed from the common drain into a sewer.

In one embodiment of the invention, in which a gas stream bearing 100 ppm hydrogen sulfide flows at 10,000 cfm through the system, about 89 lbs./day of $H_2S$ are removed at the initial treatment stage and about 38 lbs./day are removed in the downstream chamber. It will be apparent that, because of the initial hydrogen sulfide removal, less NaOCl is required for second chamber treatment. It is calculated that annual system operating costs are about $109,000. Thus, the present invention combines, in a novel manner, the advantages (Table I) of the NaOH and NaOCl process at a substantially reduced cost.

In addition to cost savings, the odor control system of the present invention provides several distinct advantages. A principal advantage is that unreacted chemicals react outside the scrubber to ensure increased reagent utilization while eliminating $H_2S$ regeneration.

In view of the foregoing, it can be seen that the present invention significantly reduces chemical cost during the lifetime of the system. In this regard, significant annual savings are realized as compared to the operating costs of conventional odor control systems.

Another advantage of the present invention, as disclosed in the above mentioned patent application, is that the system utilizes a system in which components fit into a compact boxlike structure, thereby requiring substantially less facility area.

BRIEF DESCRIPTION OF THE DRAWINGS

The above mentioned and other objects and features of this invention and the manner of attaining them will be become apparent, and the invention itself will be best understood, by reference to the following description of the embodiment of the invention in conjunction with the accompanying drawings wherein.

BEST MODE FOR CARRYING OUT THE INVENTION

Figure 1:
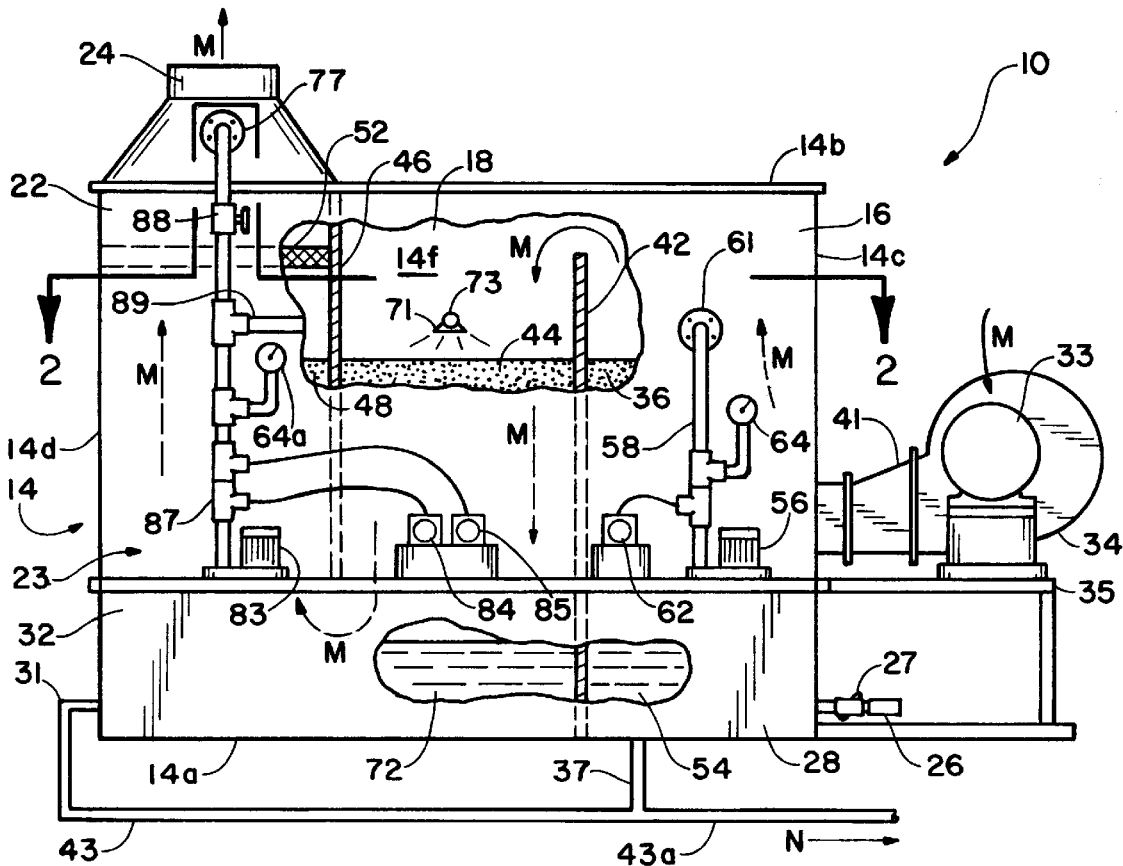
FIG. 1 is a diagrammatic view of an odor control system which is constructed according to the present invention.

Referring now to the drawings and, more particularly to FIG. 1 thereof, there is shown a new odor control system 10 which is constructed in accordance with the present invention. The system 10 receives waste gases flowing under pressure and bearing hydrogen sulfide. This unwanted constituent is scrubbed from the gas stream and a clean gas is exhausted to atmosphere.

In the system 10, a boxlike housing 14, similar to that disclosed in the above mentioned patent application, is utilized. The housing 14 contains three sequentially connected treatment chambers and, as the gas stream flows through the system, it changes direction three times. In system 10 operation, initial treatment occurs in an inlet chamber 16 where the gas stream passes through a packed bed 36 which has been wetted with NaOH. The inlet chamber 16 is located above and in fluid communication with a sump 28.

Upon completion of initial treatment in the inlet chamber 16, the gas stream flows through another packed bed 44 in an intermediate chamber 18, thence through yet another packed bed 48 located in an outlet chamber 22. A second sump 32, separated from the sump 28, is located beneath and in fluid communication with the chambers 18 and 22. Conduits 27 and 29 provide make up water to the sumps 28 and 32 respectively.

Figure 2:
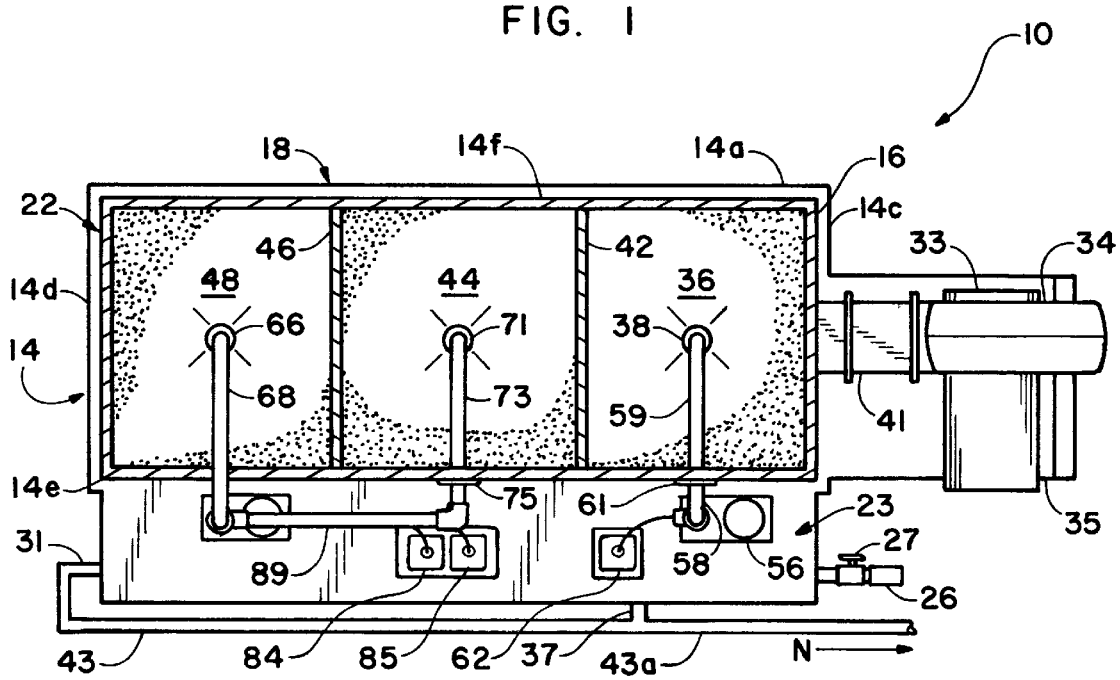
FIG. 2 is a view of the odor control system of FIG. 1, taken along line 2—2 of said figure.

With reference to FIGS. 1 and 2, the housing 14 of the system 10 includes a bottom wall 14a, a top wall 14b, side walls 14c and 14d, a front wall 14e and a back wall 14f. An interior wall 42 separates the inlet chamber 16 from the intermediate chamber 18 while another interior wall 46 separates the intermediate chamber 18 and the outlet chamber 22. It will be noted that the wall 42, while it does not extend to the top wall 14b, extends between the inlet chamber 16 and the intermediate chamber 18 to contact the bottom wall 14a, thereby defining, together with portions of the side wall 14c, back wall 14f and front wall 14e, the sump 28. In like manner, the interior wall 42, together with the side wall 14d, back wall 14f, front wall 14e and bottom wall 14a, defines the second sump 32.

Considering now FIGS. 1 and 2 in greater detail, the waste gas stream, flowing under pressure in a direction designated generally by the arrows M, enters the system 10 at an inlet 33 for initial treatment in the inlet chamber 16. The packed bed 36, used to maximize surface contact between odorous gas constituents and reactant liquids, is wetted by a NaOH solution delivered through a nozzle 38 (FIG. 2). The nozzle 38 is preferably made of Teflon, polypropylene or PVC having a full cone, wide angle non-clog construction. It is fluidly connected to a riser 58 by a header 59.

In the process of initial treatment of the gas stream, the NaOH is sprayed into the gas stream for reaction with $H_2S$ to form $Na_2S$. The pH in the chamber 16 is maintained at a lower than conventional pH (about pH 10). As a result, only about 70% of the gas borne $H_2S$ is removed and reaction products precipitate into the sump 28 as $Na_2S$. In conventional systems, the presence of $Na_2S$ in the sump can present a problem with $H_2S$ regeneration. However, as discussed below, this problem is solved by the present invention.

It will be recognized, of course, that even though all of the hydrogen sulfide is not removed during the initial treatment, by operating at the lower pH, no loss of caustic through reaction with carbon dioxide is experienced. Thus, the caustic reagent is conserved. In addition, by operating at a lower than conventional pH, the scaling and fouling problems so common in prior art scrubbers are substantially reduced.

While $Na_2S$ and unreacted NaOH flow from the inlet chamber 16 into the sump 28, the gas stream M, after passing countercurrently through the packed bed 36, flows over the wall 42 to enter the intermediate chamber 18 for further chemical treatment.

The packed bed 44 in the intermediate chamber 18 and the packed bed 48 in the outlet chamber 22 are similar in function and construction to the packed bed 36 and each contains suitable packing. The packed bed 48 is wetted through a nozzle 66 which, in turn, is fed by a header 68 while the packed bed 44 is wetted by a nozzle 71 receiving solution through a header 73. In the outlet chamber 22, the gas stream M flows upwardly through the packed bed 48, then through a mist eliminator 52 from whence it is discharged through a stack 24 to atmosphere.

For $H_2S$ removal, in the intermediate chamber 18 and in the outlet chamber 22, the reagents of choice are fresh caustic (sodium hydroxide) and sodium hypochlorite. The latter reagent is substantially more expensive than caustic. However, since it is first utilized after initial treatment has occurred, with removal of about 70% of the hydrogen sulfide, less reagent is required. Thus, substantial operating costs are realized.

In the intermediate chamber 18 and in the outlet chamber 22, as the gas flows through the packed beds 44 and 48 respectively, chemical reactions based on mass transport principles occur. Reaction products, principally $Na_2SO_4$, NaCl and sulfur, together with unreacted NaOH and unreacted NaOCl, flow in a water medium downwardly into the sump 32.

Now considering the system 10 in greater detail, a metering pump 62, also mounted on the shelf 35, may be utilized to introduce fresh chemical in addition to unreacted chemical from the sump 28 flowing through the riser 58. Riser pressure is displayed on a gauge 64. The riser 58 is connected to the flange 61 at the outer wall 14e at a height above the location of the packed bed 36. The header 59 is reversibly connected to the riser 58 at the flange 61.

With regard now to gas stream treatment, in the intermediate chamber 18 and in the outlet chamber 22, a recirculating pump 83, similar in function and construction to a pump 56 is mounted on the shelf 35. The pump 83 flows solution through the riser 87. A pair of metering pumps 84 and 85 identical in construction and function to the pump 62, is disposed on the self 35. The pumps 84 and 85 are utilized to control the amount of fresh reagent added to the aqueous solution 72 flowing through the riser 87. Riser pressure is displayed on a gauge 64a.

The gas undergoing treatment in the outlet chamber 22 is treated in a countercurrent manner and, upon exiting the packed bed 48, it flows through the mist eliminator 52 and as cleaned gas, is exhausted to atmosphere.

While the gas stream M is flowing through the chambers of the system 10, the contents of the sump 28 are flushed by water flowing under pressure into the sump 28 through a make-up water conduit 29. The sump 28 contents, including unreacted NaOH and the reaction product $Na_2S$, flow through a conduit 37 into another conduit 43. At the same time, the contents of the sump 35 are flushed by water flowing under pressure into the sump 35 through a make-up water conduit 27. The sump 35 contents, including unreacted NaOH and NaOCl and the reaction products $Na_2SO_4$, NaCl and sulfur flow through a conduit 31 into the conduit 43.

The contents of the two sumps react within the line 43 and the $Na_2S$ is oxidized. The result is a drain free of $Na_2S$ and the elimination of the problem of $H_2S$ regeneration. At this point, reaction products flow in a direction shown by an arrow N into a conduit 45 which fluidly communicates with a sewer (not shown). In this novel manner, a cleaned and environmentally acceptable liquid is discharged from the system 10.

While preferred embodiments of the invention have been shown and described, it will be apparent to those skilled in this art that various modification may be made in these embodiments without departing from the spirit of the present invention. For that reason, the scope of the invention is set forth in the following claims.

What is claimed is:

1. A method of cleaning a gas stream by removing therefrom unwanted odorous substances, comprising the steps of:

providing an unitary housing having a first treatment chamber for confining the gas stream for pretreatment, said chamber including a packed bed and a sump;

providing a second treatment chamber, within said housing, in fluid communication with said first treatment chamber, for confining the gas stream for further treatment, said second treatment chamber also including a packed bed and a sump wherein said gas stream flows cocurrently during said further treatment;

providing wall means between the first sump and the second sump for separating the contents of said sumps;

providing first conduit means for flowing liquids from said first sump and second conduit means for flowing liquids from said second sump;

providing means for receiving the liquids flowing from said first sump and from said second sump and combining together substances from the first sump and from the second sump;

wetting the packed bed in the first chamber with a surplusage of an aqueous solution, said solution containing a chemical reagent reactive to the gas stream odorous substances for chemical reaction therewith for formation of reaction products;

wetting the packed bed in the second chamber with a surplusage of an aqueous solution, said solution containing a chemical reagent reactive to the gas stream odorous substances for chemical reaction therewith for formation of reaction products;

passing sequentially the gas stream through the first and second chambers including passing the gas stream through the respective packed beds wherein the odorous substances contact and react with portions of the respective aqueous solutions with formation of reaction products;

collecting in the first and second sumps, respectively, the reaction products formed in the respective chambers and the portions of the aqueous solution unreacted with odorous substances; and delivering the collected portion of the unreacted aqueous solution to the combining means for reaction therein among said reaction products and the portions of the unreacted aqueous solution.

2. A method according to claim 1 including wetting the first chamber packed bed with an aqueous NaOH solution and wetting the second chamber packed bed with an aqueous solution, said solution including NaOH and NaOCl.

3. A method according to claim 1 including collecting in the first sump NaOH solution and $Na_2S$ and collecting in the second sump NaOH solution, NaOCl solution, sulfur, NaCl and $Na_2SO_4$.

4. A method according to claim 1 including reacting the second sump $Na_2S$ with first sump NaOH solution and NaOCl solution to oxidize the $Na_2S$.

5. A system for removing unwanted constituents from a gas stream comprising:

an unitary housing, said housing having an upstream wall with an opening therein for receiving a gas stream carrying unwanted constituents and a downstream wall having an opening therein for the exhaustion to atmosphere of a clean gas stream passing through said housing;

an inlet chamber, disposed in said housing adjacent said upstream wall, and in fluid communication with said upstream wall opening, for confining the gas stream for treatment therein and for passing the gas stream toward said downstream wall opening;

an intermediate chamber, disposed in said housing downstream of said inlet chamber, and in fluid communication therewith, for confining the gas stream for treatment therein and for passing the gas stream toward said downstream opening;

an outlet chamber, disposed in said housing adjacent said downstream wall, in fluid communication with said downstream wall opening and with said intermediate chamber, for confining the gas stream for further treatment therein and for passing the gas stream through said downstream opening;

first means for delivering an aqueous reagent solution to the gas stream flowing through said inlet chamber, wherein a first portion of said aqueous reagent solution reacts chemically with unwanted constituents in the gas stream to produce reaction products, and a second portion of said aqueous reagent solution remains unreacted;

second means for delivering an aqueous reagent solution to the gas stream flowing through said intermediate and outlet chambers, wherein a first portion of said aqueous reagent solution reacts chemically with unwanted constituents in the gas stream to produce reaction products, and a second portion of said aqueous reagent solution remains unreacted, said second means for delivering including a nozzle, located in said intermediate chamber, for spraying said aqueous reagent solution downwardly within said intermediate chamber;

a partial wall, disposed between said inlet chamber and said intermediate chamber, for passing said gas stream into said intermediate chamber so that said gas stream flows downwardly therein in a cocurrent direction in relation to the direction of spray of said nozzle;

a first sump, in fluid communication with said inlet chambers for receiving therefrom the inlet chamber reaction products and the inlet chamber unreacted aqueous reagent solution;

a second sump, in fluid communication with said intermediate and outlet chambers, for receiving therefrom the intermediate and outlet chamber reaction products and the the intermediate chamber and outlet chamber aqueous reagent solution;

wall means, disposed between said first sump and said second sump, for separating said first sump and said second sump;

a first conduit, fluidly connected to said first sump, for draining therefrom the inlet chamber reaction products and the inlet chamber unreacted aqueous reagent solution;

a second conduit, fluidly connected to said second sump, for draining therefrom the intermediate and outlet chamber reaction products and the intermediate and outlet chamber unreacted aqueous reagent solution;

fluid collecting means, disposed outside said housing, fluidly connected to said first conduit and fluidly connected to said second conduit, for receiving said first sump and said second sump reaction products and said unreacted aqueous reagent solution, respectively, for chemical reactions therebetween; and means for flowing under pressure, from said first sump and from said second sump, said respective reaction products and said unreacted aqueous reagent solution into said collecting means.

6. A system according to claim 5 wherein said aqueous reagent solution delivered to the gas stream flowing through said inlet chamber comprises NaOH.

7. A system according to claim 5 wherein by said aqueous reagent solution delivered to the gas stream flowing through said intermediate chamber comprises NaOH and NaOCl.

8. A system according to claim 5 wherein said first sump reaction products include $Na_2S$ and said first sump unreacted aqueous reagent solution includes NaOH.

9. A system according to claim 5 wherein said second sump reaction products include $Na_2SO_4$, NaCl and sulfur and said second sump unreacted aqueous reagent solution includes NaOH and NaOCl.

* * * * *